US010947421B2

(12) United States Patent
Ogawa et al.

(10) Patent No.: US 10,947,421 B2
(45) Date of Patent: Mar. 16, 2021

(54) PHOTOCURABLE LIQUID SILICONE COMPOSITION AND CURED PRODUCT THEREOF

(71) Applicant: DOW TORAY CO., LTD., Tokyo (JP)

(72) Inventors: Takuya Ogawa, Ichihara (JP); Tomohiro Iimura, Ichihara (JP); Atsushi Sugie, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 13 days.

(21) Appl. No.: 16/338,101

(22) PCT Filed: Sep. 22, 2017

(86) PCT No.: PCT/JP2017/034200
§ 371 (c)(1),
(2) Date: Mar. 29, 2019

(87) PCT Pub. No.: WO2018/066379
PCT Pub. Date: Apr. 12, 2018

(65) Prior Publication Data
US 2020/0032111 A1 Jan. 30, 2020

(30) Foreign Application Priority Data
Oct. 3, 2016 (JP) .............................. JP2016-195886

(51) Int. Cl.
C08F 2/46 (2006.01)
C08F 2/50 (2006.01)
C08G 61/04 (2006.01)
C09J 7/38 (2018.01)
C09J 11/06 (2006.01)

(52) U.S. Cl.
CPC ................ *C09J 7/38* (2018.01); *C09J 11/06* (2013.01); *C09J 2203/326* (2013.01); *C09J 2301/408* (2020.08); *C09J 2483/00* (2013.01)

(58) Field of Classification Search
CPC .. C09D 183/08; C09D 183/02; C09D 183/04; C08K 5/2937; C08K 5/13; C09J 11/06; C09J 7/36; C09J 2205/102; C09J 2205/326; C09J 2483/00; C08L 83/04; C08L 83/08
USPC ................... 522/28, 7, 6, 189, 184, 1; 520/1
See application file for complete search history.

(56) References Cited

U.S. PATENT DOCUMENTS

| | | | | |
|---|---|---|---|---|
| 4,617,238 | A * | 10/1986 | Crivello | ........... C08G 77/38 428/447 |
| 5,158,988 | A | 10/1992 | Kurita et al. | |
| 8,716,362 | B2 | 5/2014 | Ono et al. | |
| 2012/0277394 | A1 | 11/2012 | Taniguchi et al. | |
| 2018/0009985 | A1 | 1/2018 | Ogawa et al. | |

FOREIGN PATENT DOCUMENTS

| | | | |
|---|---|---|---|
| CN | 101544764 A | 9/2009 | |
| CN | 102712736 A | 10/2012 | |
| CN | 103360602 A | 10/2013 | |
| JP | H04198270 A | 7/1992 | |
| JP | 2002371261 A | 12/2002 | |
| JP | 2013253179 A | 12/2013 | |
| WO | 2012086402 A1 | 6/2012 | |
| WO | WO-2012086402 A1 * | 6/2012 | ............. C08L 83/08 |
| WO | 2016117292 A1 | 7/2016 | |
| WO | WO-2016117292 A1 * | 7/2016 | ............... C08K 5/20 |

OTHER PUBLICATIONS

Ono et al, WO 2012086402 Machine Translation, Jun. 28, 2012 (Year: 2012).*
Ogawa et al, WO 2016117292 Machine Translation, Jul. 28, 2016 (Year: 2016).*
Machine assisted English translation of CN101544764A obtained from https://patents.google.com/patent on Dec. 2, 2020, 17 pages.
Machine assisted English translation of CN103360602A obtained from https://patents.google.com/patent on Dec. 2, 2020, 9 pages.
English translation of International Search Report for International Application No. PCT/JP2017/034200 dated Nov. 7, 2017, 2 pages.
Machine assisted translation of JP2013253179A obtained from https://worldwide.espacenet.com on Mar. 27, 2019, 30 pages.
Machine assisted translation of JP2002371261A obtained from https://worldwide.espacenet.com on Mar. 28, 2019, 13 pages.

* cited by examiner

*Primary Examiner* — Jessica Whiteley
(74) *Attorney, Agent, or Firm* — Warner Norcross + Judd LLP

(57) ABSTRACT

A photocurable liquid silicone composition is disclosed. The photocurable liquid silicone composition comprises: (A) a straight chain organopolysiloxane having at least two alkenyl groups with 2 to 12 carbon atoms in a molecule, and not containing a mercaptoalkyl group; (B) an organopolysiloxane having at least two mercaptoalkyl groups in a molecule; (C) a branched chain organopolysiloxane, wherein alkenyl groups and mercaptoalkyl groups are not included; (D) a photo radical initiator containing a phosphorus atom; and (E) a hindered phenol compound. The photocurable liquid silicone composition is rapidly cured by irradiating with long wavelength light while providing excellent storage stability and coatability at room temperature and at low temperatures (e.g. approximately 0° C.), and provides a cured product that maintains transparency even when left under high temperature and high humidity conditions, with minimal clouding or discoloration.

7 Claims, No Drawings ized cured product that maintains transparency even when left under high temperature and high humidity conditions, with minimal clouding or discoloration.

PHOTOCURABLE LIQUID SILICONE COMPOSITION AND CURED PRODUCT THEREOF

CROSS-REFERENCE TO RELATED APPLICATIONS

This application is the National Stage of International Application No. PCT/JP2017/034200 filed on 22 Sep. 2017, which claims priority to and all advantages of Japan Patent Appl. No. 2016-195886 filed on 3 Oct. 2016, the content of which is hereby incorporated by reference.

TECHNICAL FIELD

The present invention relates to a photocurable liquid silicone composition and a cured product thereof.

BACKGROUND ART

Ultraviolet curable silicone compositions are used as adhesives and pressure sensitive adhesives for enhancing the visibility of an optical display. In recent years, thermoplastic resins such as polycarbonates have been used for display surface covers for safety reasons, and there is demand for a photocurable silicone composition that cures by long wavelength light (for example, visible light with a wavelength of 405 nm) that is not absorbed by this type of thermoplastic resin.

For example, Patent Document 1 proposes an ultraviolet curable silicone composition comprising: a straight chain organopolysiloxane with alkenyl groups, an organopolysiloxane with silicon atom-bonded mercaptoalkyl groups, an acylphosphine oxide type photoreaction initiator, and an acetophenone and/or a propiophenone. However, this type of ultraviolet curable silicone composition has poor deep curing properties by irradiation of long wavelength light, along with problems with insufficient curing, and problems in that discoloration and clouding occur when the cured product obtained is exposed to high temperature or high humidity conditions.

Furthermore, Patent Document 2 proposes an ultraviolet curable silicone pressure sensitive adhesive composition comprising: a straight chain organopolysiloxane with alkenyl groups, an organopolysiloxane with a unique structure containing silicon atom-bonded mercaptoalkyl groups, a resin (MQ resin) that does not undergo a cross-linking reaction, and a photo radical initiator. However, this type of ultraviolet curable silicone composition also has poor deep curing properties by irradiation of long wavelength light, along with problems with insufficient curing, and problems in that discoloration and clouding occur when the cured product obtained is exposed to high temperature or high humidity conditions.

PRIOR ART DOCUMENTS

Patent Documents

Patent Document 1: Japanese Unexamined Patent Application Publication No. 2013-253179 A
Patent Document 2: Japanese Unexamined Patent Application Publication No. 2002-371261 A

SUMMARY OF THE INVENTION

Problems to be Solved by the Invention

An object of the present invention is to provide a photocurable liquid silicone composition that is rapidly cured by irradiating with long wavelength light while providing excellent storage stability and coatability at room temperature and at low temperatures (approximately 0° C.), and to provide a cured product that maintains transparency even when left under high temperature and high humidity conditions, with minimal clouding or discoloration.

Means for Solving the Problems

The photocurable liquid silicone composition of the present invention comprises:

(A) a straight chain organopolysiloxane with a viscosity at 23° C. of 50 to 100,000 mPa·s, containing at least two alkenyl groups with 2 to 12 carbon atoms in a molecule, and not containing a mercaptoalkyl group;

(B) an organopolysiloxane with a viscosity of 10 to 10,000 mPa·s at 23° C. and having at least two mercaptoalkyl groups in a molecule, in an amount such that the amount of mercaptoalkyl groups in this component is 0.2 to 3 moles with regard to 1 mole of the alkenyl groups in component (A);

(C) a branched chain organopolysiloxane containing siloxane units represented by the formula: $R^3SiO_{3/2}$ (wherein $R^3$ represents an alkyl group with 1 to 12 carbon atoms, an aryl group with 6 to 20 carbon atoms, an aralkyl group with 7 to 20 carbon atoms, a hydroxyl group, or an alkoxy group with 1 to 6 carbon atoms) and/or siloxane units represented by the formula: $SiO_{4/2}$, wherein the molar ratio of siloxane units represented by the formula: $R^3SiO_{3/2}$ and the siloxane units represented by the formula: $SiO_{4/2}$ of all of the siloxane units in component (C) is at least 0.5, and alkenyl groups and mercaptoalkyl groups are not included;

(D) a photo radical initiator containing a phosphorus atom; and (E) a hindered phenol compound, wherein the amount of component (C) is 25 to 80 parts by mass, the amount of component (D) is 0.01 to 1.0 parts by mass, and the amount of component (E) is 0.001 to 1.0 parts by mass, with regard to 100 parts by mass of a total of component (A) through component (E).

The cured product of the present invention is made by irradiating and curing the above-mentioned photocurable liquid silicone composition.

Effects of the Invention

The photocurable liquid silicone composition of the present invention is rapidly cured by irradiating with long wavelength light while providing excellent storage stability and coatability at room temperature and at low temperatures (approximately 0° C.), and provides a cured product that maintains transparency even when left under high temperature and high humidity conditions, with minimal clouding or discoloration. Furthermore, the cured product of the present invention maintains transparency and has minimal clouding and discoloration even when left in high temperature high humidity conditions.

MODE FOR CARRYING OUT THE INVENTION

The photocurable liquid silicone composition of the present invention is described below in detail.

Component (A) is a straight chain organopolysiloxane containing at least two alkenyl groups with 2 to 12 carbon atoms in a molecule, and not containing a mercaptoalkyl group. Preferable examples of the alkenyl group in component (A) include vinyl groups, allyl groups, butenyl groups, pentenyl groups, hexenyl groups, heptenyl groups, octenyl groups, nonenyl groups, decenyl groups, undecenyl groups, and dodecenyl groups, but from the perspective of economics and reactivity, vinyl groups, allyl groups, hexenyl groups, and octenyl groups are preferable. Furthermore, examples of silicon atom-bonded groups other than alkenyl groups in component (A) include: alkyl groups with 1 to 12 carbon atoms such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups with 6 to 12 carbon atoms such as phenyl groups, tolyl groups, xylyl groups, and the like; aralkyl groups with 7 to 12 carbon atoms such as benzyl groups, phenethyl groups, and the like; halogen substituted alkyl groups with 1 to 12 carbon atoms such as 3-chloropropyl groups, 3,3,3-trifluoropropyl groups, and the like; but from the perspective of economics and heat resistance, methyl groups are preferable. Furthermore, the silicon atom in component (A) may be bonded to a small amount of hydroxyl groups or alkoxy groups such as methoxy groups, ethoxy groups, n-propoxy groups, i-propoxy groups, n-butoxy groups, sec-butoxy groups, tert-butoxy groups and the like.

The viscosity of component (A) at 23° C. is within a range of 50 to 100,000 mPa·s, preferably within a range of 100 to 100,000 mPa·s, alternatively within a range of 100 to 50,000 mPa·s, and alternatively within a range of 100 to 10,000 mPa·s. This is because if the viscosity of component (A) is not less than the lower limit of the aforementioned range, the mechanical properties of the cured product obtained will be enhanced; however, on the other hand, if the viscosity is not more than the upper limit of the aforementioned range, the coatability of the composition obtained will be enhanced.

Component (A) can be represented, for example, by the general formula:

$R^1_3SiO(R^1_2SiO)_mSiR^1_3$.

In the formula, $R^1$ is the same or different monovalent hydrocarbon group having 1 to 12 carbon atoms, and examples include alkyl groups having 1 to 12 carbon atoms such as methyl groups, ethyl groups, propyl groups, butyl groups, pentyl groups, hexyl groups, heptyl groups, octyl groups, nonyl groups, decyl groups, undecyl groups, and dodecyl group, and the like; alkenyl groups having 2 to 12 carbon atoms such as vinyl groups, allyl groups, butenyl groups, pentenyl groups, hexenyl groups, heptenyl groups, octenyl groups, nonenyl groups, decenyl groups, undecenyl groups, dodecenyl groups, and the like; aryl groups having 6 to 12 carbon atoms such as phenyl groups, tolyl groups, and xylyl groups, and the like; aralkyl groups having 7 to 12 carbon atoms such as benzyl groups, phenethyl groups, and the like; halogen-substituted alkyl groups having 1 to 12 carbon atoms, such as a 3-chloropropyl groups, 3,3,3-trifluoropropyl groups, and the like; however, at least two $R^1$ in a molecule are alkenyl groups described above. Furthermore, m in the formula is an integer of 1 or higher, wherein the viscosity of component (A) at 23° C. is within a range of 50 to 100,000 mPa·s.

This type of component (A) can be a mixture of two or more types of organopolysiloxanes represented by the following general formulas. Note that in the formulas, Me, Vi, and Ph represent methyl groups, vinyl groups, and phenyl groups, respectively; wherein, m' and m" represent integers that are 1 or higher such that the viscosity at 23° C. is within a range of 50 to 100,000 mPa·s, and m''' is an integer of 2 or higher such that the viscosity at 23° C. is within a range of 50 to 100,000 mPa·s.

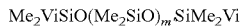

$Me_2ViSiO(Me_2SiO)_{m'}SiMe_2Vi$

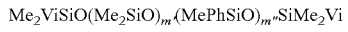

$Me_2ViSiO(Me_2SiO)_{m'}(MePhSiO)_{m''}SiMe_2Vi$ $Me_2ViSiO(Me_2SiO)_{m'}(Ph_2SiO)_{m''}SiMe_2Vi$

$Me_2ViSiO(Me_2SiO)_{m'}(MeViSiO)_{m''}SiMe_2Vi$

$Me_3SiO(Me_2SiO)_{m'}(MeViSiO)_{m''}SiMe_3$

$Me_3SiO(MeViSiO)_{m'''}SiMe_3$

Component (B) is an organopolysiloxane with at least two mercaptoalkyl groups in a molecule, and is a component for curing this composition by reacting with the alkenyl groups in component (A) under irradiation. Examples of the mercaptoalkyl group in component (B) include 3-mercaptopropyl groups, 4-mercaptobutyl groups, and 6-mercaptohexyl groups. Furthermore, examples of silicon atom-bonded groups other than mercaptoalkyl groups in component (B) include: alkyl groups with 1 to 12 carbon atoms such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups with 6 to 12 carbon atoms such as phenyl groups, tolyl groups, xylyl groups, and the like; aralkyl groups with 7 to 12 carbon atoms such as benzyl groups, phenethyl groups, and the like; halogen substituted alkyl groups with 1 to 12 carbon atoms such as 3-chloropropyl groups, 3,3,3-trifluoropropyl groups, and the like; but from the perspective of economics and heat resistance, methyl groups are preferable. Furthermore, the silicon atom in component (B) may be bonded to a small amount of hydroxyl groups or alkoxy groups such as methoxy groups, ethoxy groups, n-propoxy groups, i-propoxy groups, n-butoxy groups, sec-butoxy groups, tert-butoxy groups and the like.

The viscosity of component (B) at 23° C. is within a range of 10 to 10,000 mPa·s, preferably within a range of 10 to 1,000 mPa·s, and alternatively within a range of 10 to 500 mPa·s. This is because, if the viscosity of component (B) is not less than the lower limit of the aforementioned range, the mechanical properties of the cured product obtained will be enhanced; however, if, on the other hand, the viscosity is not more than the upper limit of the aforementioned range, the transparency and coatability of the composition obtained will be enhanced.

Examples of this type of component (B) can include, for example, (B1) straight chain organopolysiloxanes represented by the general formula:

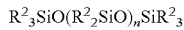

$R^2_3SiO(R^2_2SiO)_nSiR^2_3$ and/or (B2) branched chain organopolysiloxanes represented by the average unit formula:

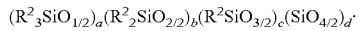

$(R^2_3SiO_{1/2})_a(R^2_2SiO_{2/2})_b(R^2SiO_{3/2})_c(SiO_{4/2})_d$.

In the formula, $R^2$ is the same or different monovalent hydrocarbon group with 1 to 12 carbon atoms that does not have a mercaptoalkyl group or an aliphatic unsaturated bond. Examples of the mercaptoalkyl groups are the same groups as described above. Furthermore, the monovalent hydrocarbon groups that do not have an aliphatic unsaturated bond are the same as described above, with examples including alkyl groups with 1 to 12 carbon atoms, aryl groups with 6 to 12 carbon atoms, aralkyl groups with 7 to 12 carbon atoms, and halogen substituted alkyl groups with 1 to 12 carbon atoms However, at least two of all $R^2$ groups are mercaptoalkyl groups described above.

Furthermore, n in the formula is an integer of 1 or higher, wherein the viscosity of component (B1) at 23° C. is 10 to 10,000 mPa·s.

Furthermore, in the formula, a, b, c, and d are numbers from 0 to 1, and the total of a, b, c, and d are 1 in a molecule. However, c or d is a number that exceeds 0.

Component (B1) can be a mixture of two or more types of organopolysiloxanes represented by the following general formulas. Note that in the formulas, Me, Ph, and Thi represent methyl groups, phenyl groups, and 3-mercaptopropyl groups, respectively; n' and n" represent integers that are 1 or higher, respectively such that the viscosity at 23° C. is within a range of 10 to 10,000 mPa·s, and n''' is an integer of 2 or higher such that the viscosity at 23° C. is within a range of 10 to 10,000 mPa·s.

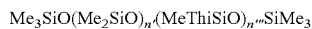

Me$_3$SiO(Me$_2$SiO)$_{n'}$(MeThiSiO)$_{n'''}$SiMe$_3$

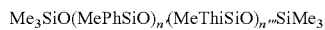

Me$_3$SiO(MePhSiO)$_{n'}$(MeThiSiO)$_{n'''}$SiMe$_3$

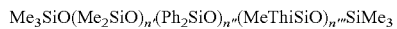

Me$_3$SiO(Me$_2$SiO)$_{n'}$(Ph$_2$SiO)$_{n''}$(MeThiSiO)$_{n'''}$SiMe$_3$

Component (B2) can be one type or a mixture of two or more types of organopolysiloxanes represented by the following average unit formulas. Note that in the formula, Me, Ph, and Thi represent methyl groups, phenyl groups, and 3-mercaptopropyl groups, respectively; wherein, a', b', b", c', and d' represent numbers from 0 to 1, respectively (however, 0 is not included), and the total of a', b', b", c', and d' is 1 in a molecule.

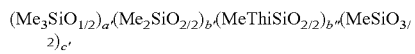

(Me$_3$SiO$_{1/2}$)$_{a'}$(Me$_2$SiO$_{2/2}$)$_{b'}$(MeThiSiO$_{2/2}$)$_{b''}$(MeSiO$_{3/2}$)$_{c'}$

(Me$_3$SiO$_{1/2}$)$_{a'}$(MeThiSiO$_{2/2}$)$_{b'}$(MeSiO$_{3/2}$)$_{c'}$

(Me$_3$SiO$_{1/2}$)$_{a'}$(MeThiSiO$_{2/2}$)$_{b'}$(ThiSiO$_{3/2}$)$_{c'}$

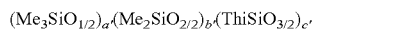

(Me$_3$SiO$_{1/2}$)$_{a'}$(Me$_2$SiO$_{2/2}$)$_{b'}$(ThiSiO$_{3/2}$)$_{c'}$

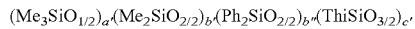

(Me$_3$SiO$_{1/2}$)$_{a'}$(Me$_2$SiO$_{2/2}$)$_{b'}$(Ph$_2$SiO$_{2/2}$)$_{b''}$(ThiSiO$_{3/2}$)$_{c'}$

(Me$_3$SiO$_{1/2}$)$_{a'}$(MeThiSiO$_{2/2}$)$_{b'}$(PhSiO$_{3/2}$)$_{c'}$

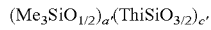

(Me$_3$SiO$_{1/2}$)$_{a'}$(ThiSiO$_{3/2}$)$_{c'}$

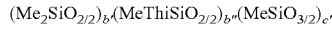

(Me$_2$SiO$_{2/2}$)$_{b'}$(MeThiSiO$_{2/2}$)$_{b''}$(MeSiO$_{3/2}$)$_{c'}$

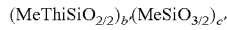

(MeThiSiO$_{2/2}$)$_{b'}$(MeSiO$_{3/2}$)$_{c'}$

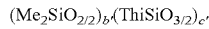

(Me$_2$SiO$_{2/2}$)$_{b'}$(ThiSiO$_{3/2}$)$_{c'}$ (Me$_2$SiO$_{2/2}$)$_{b'}$(MeThiSiO$_{2/2}$)$_{b''}$(ThiSiO$_{3/2}$)$_{c'}$

(Me$_3$SiO$_{1/2}$)$_{a'}$(MeThiSiO$_{2/2}$)$_{b'}$(SiO$_{4/2}$)$_{d'}$

The amount of component (B) is such that the amount of mercaptoalkyl groups in this component is within a range of 0.2 to 3 moles, preferably within a range of 0.5 to 2 moles, and alternatively within a range of 0.5 to 1.5 moles, with regard to 1 mole of the alkenyl groups in component (A). This is because if the amount of component (B) is not less than the lower limit of the aforementioned range, the composition obtained will sufficiently cure; however, if, on the other hand, the amount is not more than the upper limit of the aforementioned range, the mechanical properties of the cured product obtained will be enhanced.

Component (C) is a branched chain organopolysiloxane containing siloxane units represented by the formula: $R^3SiO_{3/2}$ and/or siloxane units represented by the formula: $SiO_{4/2}$, and not having alkenyl groups and mercaptoalkyl groups. In the formula, $R^3$ is alkyl groups with 1 to 12 carbon atoms, aryl groups with 6 to 20 carbon atoms, aralkyl groups with 7 to 20 carbon atoms, hydroxyl groups, or alkoxy groups with 1 to 6 carbon atoms, and specific examples include alkyl groups such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups such as phenyl groups, tolyl groups, xylyl groups, and the like; aralkyl groups such as benzyl groups, phenethyl groups, and the like; hydroxyl groups; and alkoxy groups such as methoxy groups, ethoxy groups, propoxy groups, and the like.

Component (C) contains siloxane units represented by the formula: $R_3SiO_{3/2}$ and/or siloxane units represented by the formula: $SiO_{4/2}$, but other siloxane units that may be included are siloxane units represented by the formula: $R^3{}_2SiO_{2/2}$ and siloxane units represented by the formula: $R^3{}_3SiO_{1/2}$. Note that in the formula, $R^3$ are the same groups as described above. However, the molar ratio of siloxane units represented by the formula: $R^3SiO_{3/2}$ and siloxane units represented by the formula: $SiO_{4/2}$ with regard to all of the siloxane units in component (C) is at least 0.5. This is because if the value is not less than the aforementioned lower limit, the pressure sensitive adhesion of the cured product obtained will be higher. Incidentally, the upper limit of this value is not restricted, but is preferably 0.65 or lower, due to good solubility with other organopolysiloxanes.

Furthermore, while the molecular weight of component (C) is not limited, the weight average molecular weight as measured by the gel permeation chromatography method is preferably within a range of 2,000 to 50,000. This is because if the weight average molecular weight of component (C) is not less than the lower limit of the aforementioned range, the pressure sensitive adhesion properties of the cured product obtained will be enhanced, but on the other hand, if the weight average molecular weight is not more than the upper limit of the aforementioned range, the moldability of the composition obtained will be enhanced.

Component (C) can be one type or a mixture of two or more types of organopolysiloxanes represented by the following average unit formulas. Note that in the formula, Me and Ph represent methyl groups and phenyl groups, respectively; wherein, e, f, g, g', and h each represent numbers from 0 to 1 that express the ratio of the constitutional units (however, 0 is not included), and the total of e, f, g, g', and h is 1 in a molecule.

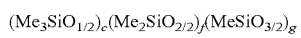

(Me$_3$SiO$_{1/2}$)$_e$(Me$_2$SiO$_{2/2}$)$_f$(MeSiO$_{3/2}$)$_g$

(Me$_3$SiO$_{1/2}$)$_e$(Me$_2$SiO$_{2/2}$)$_f$(SiO$_{4/2}$)$_h$

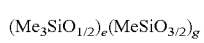

(Me$_3$SiO$_{1/2}$)$_e$(MeSiO$_{3/2}$)$_g$

(Me$_3$SiO$_{1/2}$)$_e$(SiO$_{4/2}$)$_h$

(Me$_3$SiO$_{1/2}$)$_e$(Me$_2$SiO$_{2/2}$)$_f$(MeSiO$_{3/2}$)$_g$(SiO$_{4/2}$)$_h$

(Me$_3$SiO$_{1/2}$)$_e$(MeSiO$_{3/2}$)$_g$(SiO$_{4/2}$)$_h$

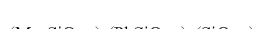

(Me$_3$SiO$_{1/2}$)$_e$(PhSiO$_{3/2}$)$_g$(SiO$_{4/2}$)$_h$

(Me$_3$SiO$_{1/2}$)$_e$(MeSiO$_{3/2}$)$_g$(PhSiO$_{3/2}$)$_{g'}$

(Me$_3$SiO$_{1/2}$)$_e$(Ph$_2$SiO$_{2/2}$)$_f$(SiO$_{4/2}$)$_h$

The amount of component (C) is within a range of 25 to 80 parts by mass, preferably within a range of 40 to 80 parts by mass, or alternatively within range of 40 to 65 parts by mass, with regard to 100 parts by mass of a total of component (A) through component (E). This is because if the amount of component (C) is not less than the lower limit of the aforementioned range, the curing properties of the composition obtained will be favorable and the transparency of the cured product obtained will be favorable; however, if, on the other hand, the amount is not more than the upper limit of the aforementioned range, the pressure sensitive adhesive properties of the cured product obtained will be favorable.

Component (D) is a photo radical initiator containing a phosphorus atom that promotes curing of this composition. As the component (D), for example, a photo radical initiator having a P=O bond in the molecule can be mentioned, and specific examples include diphenyl(2,4,6-trimethylbenzoyl)phosphine oxide (trade name Darocur TPO, manufactured by BASF Corporation), ethoxyphenyl(2,4,6-trimethylbenzoyl)phosphine oxide (trade name Irgacure TPO-L, manufactured by BASF Corporation), a 50/50 (parts by mass) mixture of diphenyl(2,4,6-trimethylbenzoyl)phosphine oxide and 2-hydroxy-2-methyl-1-phenylpropanone (trade name Darocur 4265, manufactured by BASF Corporation), phenylbis (2,4,6-trimethylbenzoyl)phosphine oxide (trade name Irgacure 819, manufactured by BASF Corporation), and a mixture of ethoxyphenyl(2,4,6-trimethylbenzoyl)phosphine oxide and phenylbis(2,4,6-trimethylbenzoyl)phosphine oxide (trade name Irgacure 2100, manufactured by BASF Corporation). Furthermore, the photo radical initiator having a P=O bond can be formulated as a mixture that is dissolved in a liquid photo radical initiator not having a P=O bond, such as 2-hydroxy-2-methyl-1-phenyl-propan-1-one at an arbitrary ratio.

The amount of component (D) is within a range of 0.01 to 1.0 parts by mass, preferably within a range of 0.05 to 0.5 parts by mass, or alternatively within a range of 0.05 to 0.2 parts by mass, with regard to 100 parts by mass of a total of component (A) through component (E). This is because if the amount of component (D) is not less than the lower limit of the aforementioned range, the curing properties of the composition obtained will the favorable; however, if, on the other hand, the amount is not more than the upper limit of the aforementioned range, the heat resistance and light resistance of the cured product obtained will be favorable.

Component (E) is a hindered phenol compound for maintaining favorable storage stability of the composition, and to provide heat resistance to the cured product. Examples of component (E) include 2,6-bis(hydroxymethyl)-p-cresol, 2,6-di-tert-butyl-4-methylphenol, 2,6-di-tert-butyl-4-hydroxymethylphenol, pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 2,4-dimethyl-6-(1-methylpentadecyl)phenol, diethyl[{3,5-bis(1,1-di-tert-butyl-4-hydroxyphenyl)methyl}phosphonate, 3,3', 3",5,5',5"-hexane-tert-butyl-4-a,a',a"-(mesitylene-2,4,6-tolyl) tri-p-cresol, 4,6-bis(octylthiomethyl)-o-cresol, ethylene bis(oxyethylene)bis[3-(5-tert-butyl-4-hydroxy-m-tolyl)propionate], hexamethylene bis[3-(3,5-di-tert-butyl-4-hydroxyphenyl) propionate].

The amount of component (E) is within a range of 0.001 to 1 parts by mass, preferably within a range of 0.01 to 1 parts by mass, or alternatively within range of 0.01 to 0.5 parts by mass, with regard to 100 parts by mass of a total of component (A) through component (E). This is because if the amount of component (E) is not less than the lower limit of the aforementioned range, the storage stability of the composition obtained will the favorable; however, if, on the other hand, the amount is not more than the upper limit of the aforementioned range, the heat resistance and light resistance of the cured product obtained will be favorable.

In order to enhance the transparency of the cured product obtained under high temperature and high humidity conditions, the composition can contain (F) an organopolysiloxane having an organic group with an ether bond and an alkenyl group with 2 to 12 carbon atoms in a molecule, but not having a mercaptoalkyl group. The organic group having an ether bond can be an alkyl group containing polyethylene oxide, or an alkyl group containing polyethylene oxide and polypropylene oxide, and for example, can be represented by the general formula:

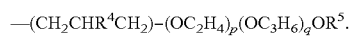

—(CH$_2$CHR$^4$CH$_2$)–(OC$_2$H$_4$)$_p$(OC$_3$H$_6$)$_q$OR$^5$.

In the formula, R$^4$ represents a hydrogen atom or a methyl group. Furthermore, in the formula, R$^5$ represents a hydrogen atom or an alkyl group with 1 to 3 carbon atoms, such as a methyl group, ethyl group, or propyl group. Furthermore, in the formula, p is an integer from 1 to 100, inclusive, and q is an integer from 0 to 50, inclusive.

Furthermore, examples of the alkenyl group in component (F) include vinyl groups, allyl groups, butenyl groups, pentenyl groups, hexenyl groups, heptenyl groups, octenyl groups, nonenyl groups, decenyl groups, undecenyl groups, and dodecenyl groups, but vinyl groups are preferable.

Furthermore, examples of silicon atom-bonded groups other than organic groups with an ether bond and alkenyl groups with 2 to 12 carbon atoms in component (F) include: alkyl groups with 1 to 12 carbon atoms such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups with 6 to 12 carbon atoms such as phenyl groups, tolyl groups, xylyl groups, and the like; aralkyl groups with 7 to 12 carbon atoms such as benzyl groups, phenethyl groups, and the like; halogen substituted alkyl groups with 1 to 12 carbon atoms such as 3-chloropropyl groups, 3,3,3-trifluoropropyl groups, and the like; but from the perspective of economics and heat resistance, methyl groups are preferable.

While the viscosity of component (F) at 23° C. is not limited, it is preferably within a range of 10 to 10,000 mPa·s.

The organopolysiloxane of component (F) can be represented, for example, by the general formula:

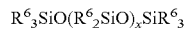

R$^6_3$SiO(R$^6_2$SiO)$_x$SiR$^6_3$

In the formula, R$^6$ represents the same or different monovalent hydrocarbon group with 1 to 12 carbon atoms or an organic group having an ether bond. Examples of the organic group having an ether bond are the same groups as described above. Furthermore, the monovalent hydrocarbon groups with 1 to 12 carbon atoms are the same as described above, such as alkyl groups with 1 to 12 carbon atoms, alkenyl groups with 2 to 12 carbon atoms, aryl groups with 6 to 12 carbon atoms, aralkyl groups with 7 to 12 carbon atoms, and halogen substituted alkyl groups with 1 to 12 carbon atoms. However, at least one R$^6$ in a molecule is the organic group having an ether bond described above, and at least one R$^6$ is the alkenyl group described above. Furthermore, x is an integer that is 1 or higher, and preferably is a value such that the viscosity at 23° C. is within a range of 10 to 10,000 mPa·s.

This type of component (F) can be one type or a mixture of two or more types of organopolysiloxanes expressed by the following general formulas. Note that, in the formulas, Me, Vi, Hex, EO, and PO represent a methyl group, vinyl group, hexenyl group, oxyethylene group, or oxypropylene group, respectively; wherein, x', x", and x''' are all integers 1 or higher, p is an integer from 1 to 100, inclusive, and q' is an integer from 1 to 50, inclusive.

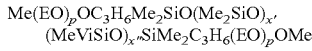

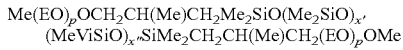

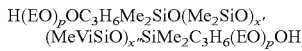

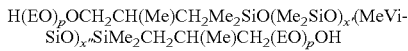

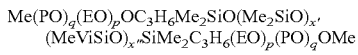

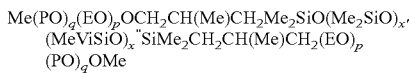

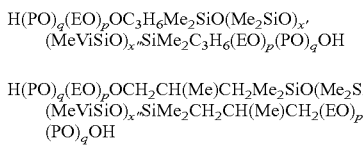

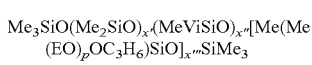

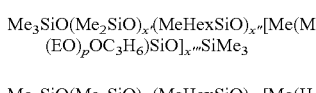

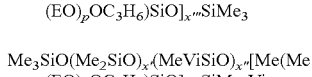

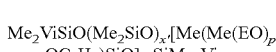

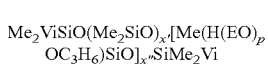

The method for producing component (F) is not limited, and can include, for example: a method of causing a hydrosilylation reaction between an organopolysiloxane containing a silicon atom-bonded hydrogen atom and an ether compound having an aliphatic unsaturated group to produce an organopolysiloxane having an ether group, then causing an equilibrium reaction between this organopolysiloxane and organopolysiloxane having an alkenyl group, in the presence of a base; and a method of causing a hydrosilylation reaction between an organopolysiloxane containing a silicon atom-bonded hydrogen atom and an ether compound having an aliphatic unsaturated group to produce an organopolysiloxane having an ether group, then causing a hydrosilylation reaction between the excess of silicon atom-bonded hydrogen atoms and an organic compound having two aliphatic unsaturated groups.

The amount of component (F) is not restricted, but the amount is preferably within a range of 1 to 50 parts by mass, alternatively within a range of 1 to 30 parts by mass, and alternatively within a range of 1 to 15 parts by mass, with regard to 100 parts by mass of a total of component (A) through component (E), because the curing properties and the storage stability of the composition will be favorable, and the transparency of the cured product at high temperature and high humidity can be enhanced.

In order to reduce the cross-linking density of the cured product obtained, thereby enhancing the mechanical properties and the pressure sensitive adhesion, the present composition may contain (G) an organic compound having one aliphatic unsaturated bond and not having a siloxane bond, in a molecule. Component (G) is preferably an organic compound demonstrating favorable solubility with component (A) through component (E), along with favorable storage stability and therefore a boiling point of 200° C. or higher at 1 atm., for example. Examples of component (G) include straight chain aliphatic olefins such as dodecene, tetradecene, hexadecene, octadecene, and the like; cyclic aliphatic olefins such as 4-phenyl-1-cyclohexene, and the like; and unsaturated alcohol such as 9-decen-1-ol, oleyl alcohol, terpen-4-ol, and the like.

The amount of component (G) is not restricted, but the amount is preferably within a range of 0.1 to 10 parts by mass, and alternatively within a range of 0.1 to 5 parts by mass, with regard to 100 parts by mass of a total of component (A) through component (E), because the curing properties of the composition will be favorable, and the mechanical properties of the cured product obtained will be favorable.

Within an extent that the object of the present invention is not hindered, the present composition may contain (H) a branched organopolysiloxane containing siloxane units represented by the formula: $R^7SiO_{3/2}$ and/or siloxane units represented by the formula: $SiO_2$, having an alkenyl group, but not having a mercaptoalkyl group. In the formula, $R^7$ represents an alkyl group with 1 to 12 carbon atoms, an alkenyl group with 2 to 12 carbon atoms, a hydroxyl group, or an alkoxy group with 1 to 6 carbon atoms. Examples of the alkyl group include methyl groups, ethyl groups, propyl groups, butyl groups, pentyl groups, hexyl groups, heptyl groups, octyl groups, nonyl groups, decyl groups, undecyl groups, and dodecyl groups. Furthermore, examples of the alkenyl group include vinyl groups, allyl groups, butenyl groups, pentenyl groups, hexenyl groups, heptenyl groups, octenyl groups, nonenyl groups, decenyl groups, undecenyl groups, and dodecenyl groups. Furthermore, examples of the alkoxy group include methoxy groups, ethoxy groups, propoxy groups, and butoxy groups. Note that if the siloxane units represented by the formula: $R^7SiO_{3/2}$ does not have an alkenyl group, the other siloxane units must be siloxane units represented by the formula: $R^8{}_3SiO_{1/2}$ and/or siloxane units represented by the formula: $R^8{}_2SiO_{2/2}$. Note that in the formula, $R^8$ represents an alkyl group with 1 to 12 carbon atoms, an alkenyl group with 2 to 12 carbon atoms, a hydroxyl group, or an alkoxy group with 1 to 6 carbon atoms, and examples are the same as described above. Note that at least one $R^8$ in a molecule is an alkenyl group.

Component (H) can be one type or a mixture of two or more types of organopolysiloxanes represented by the following average unit formulas. Note that in the formulas, Me and Vi represent methyl groups and vinyl groups, respectively; wherein, i, i', j, j', k, and l each represent numbers from 0 to 1 that express the ratio of the constitutional units (however, 0 is not included), but the total of i, i', j, j', k, and l is 1 in a molecule.

$(Me_3SiO_{1/2})_i(Me_2ViSiO_{1/2})_i(MeSiO_{3/2})_k$ $(Me_2ViSiO_{1/2})_i(Me_2SiO_{2/2})_j(MeSiO_{3/2})_k$ $(Me_3SiO_{1/2})_i(Me_2ViSiO_{1/2})_i(Me_2SiO_{2/2})_j(MeSiO_{3/2})_k$ $(Me_3SiO_{1/2})_i(Me_2ViSiO_{1/2})_i(MeViSiO_{2/2})_j$
  $(MeSiO_{3/2})_k$ $(Me_3SiO_{1/2})_i(Me_2SiO_{2/2})_j(MeViSiO_{2/2})_j(MeSiO_{3/2})_k$ $(Me_3SiO_{1/2})_i(Me_2ViSiO_{1/2})_i(SiO_{4/2})_l$ $(Me_2ViSiO_{1/2})_i(SiO_{4/2})_l$ $(Me_3SiO_{1/2})_i(MeViSiO_{2/2})_j(SiO_{4/2})_l$ $(Me_2ViSiO_{1/2})_i(Me_2SiO_{2/2})_j(SiO_{4/2})_l$ $(Me_3SiO_{1/2})_i(Me_2ViSiO_{1/2})_i(Me_2SiO_{2/2})_j(SiO_{4/2})_l$ $(Me_2ViSiO_{1/2})_i(Me_2SiO_{2/2})_j(MeViSiO_{2/2})_j(SiO_{4/2})_l$ $(Me_2ViSiO_{1/2})_i(Me_2SiO_{2/2})_j(MeSiO_{3/2})_k(SiO_{4/2})_l$

While the amount of component (H) is not limited, the ratio of alkenyl groups in component (H) with regard to the total of alkenyl groups in component (A) and the alkenyl groups in component (H) is preferably less than 50%, alternatively less than 20%, and alternatively less than 10%. This is because if the amount of component (H) is not less than the upper limit of the aforementioned range, there will be a significant reduction in the mechanical properties of the cured product obtained, particularly the tensile elongation at break.

Furthermore, so long as the object of the present invention is not hindered, the composition can contain conventionally known additives as necessary, in addition to the aforementioned components, with examples including: metal oxide fine powders such as fumed silica, wet silica, and the like; adhesion promoters such as vinyl triethoxysilane, allyl trimethoxysilane, allyl triethoxysilane, 3-glycidoxypropyl trimethoxysilane, and the like; low molecular weight siloxane containing an alkenyl group as a reactive diluent, such as 1,1,3,3-tetramethyl-1,3-divinyldisiloxane, 1,3,5,7-tetramethyl-1,3,5,7-tetravinylcyclotetrasiloxane, and the like; and heat resistance enhancing agents such as N-nitrosophenylhydroxylamine aluminum salt, and the like.

While the viscosity of the present composition at 23° C. is not limited, it is preferably 100,000 mPa·s or less, alternatively within a range of 100 to 100,000 mPa·s, and alternatively within a range of 500 to 10,000 mPa·s. This is because if the viscosity of the composition is not less than the lower limit of the aforementioned range, the mechanical properties of the cured product obtained will be favorable; however, if, on the other hand, the viscosity is not more than the upper limit of the aforementioned range, the coatability of the composition obtained will be enhanced and the formation of voids in the cured product can be avoided.

The present composition can be produced by blending to uniformity component (A) through component (E), and if necessary, other arbitrary components. When preparing this composition, mixing can be performed at room temperature using various types of mixers or kneaders, and if necessary, mixing can be performed while heating. Furthermore, the order of combining the various components is not restricted, and mixing can be performed in any order. On the other hand, in order to avoid the effect of curing during preparation of the composition, it is recommended that preparation be performed in a location without mixing of light with a wavelength of 450 nm or less, or in an area where mixing of the aforementioned light is restricted as far as possible.

The present composition can be cured by light irradiation. While the light used for curing the composition can be ultraviolet light or visible light, for example, the wavelength of the light is preferably within a range of 250 to 500 nm, with the composition thereof having preferable curing properties by visible light with a wavelength of 400 nm or longer (for example, an LED light source with a wavelength of 405 nm).

The present composition is useful as various types of potting agents, sealing agents, and adhesives, and the cured product thereof has minimal discoloration and does not readily cloud under high temperature or high temperature and high humidity conditions, and therefore is suitably used as a material for forming intermediate layers between the image display part and the protective part of an image display device.

The present composition cures at room temperature, and therefore can be suitably used for coating substrates with poor heat resistance. The type of substrate is generally a transparent substrate such as glass, and synthetic resin films, sheets, and coatings, and the like. Furthermore, the application method of the composition can be, for example, gravure coating, microgravure coating, slit coating, slot die coating, screen printing, or comma coating.

Next, the cured product of the present invention will be described in detail.

The cured product of the present invention is made by irradiating light and curing the photocurable liquid silicone composition. While the shape of the cured product is not particularly limited, examples include sheets, films, tapes, and lumps. Furthermore, integrating with various types of substrates is also possible.

The forming method of the cured product can be a method of applying the composition to a film shaped substrate, tape shaped substrate, or sheet shaped substrate, then curing by irradiating light forming a cured film made of the cured product on the surface of the substrate. The film thickness of the cured film is not restricted, but is preferably 1 to 3000 μm, or 40 to 3000 μm.

EXAMPLES

The photocurable liquid silicone composition and cured product thereof is described below in further detail using examples. Note that in the formulas, Me, Vi, Ph, Thi, and EO indicate methyl groups, vinyl groups, phenyl groups, 3-thiolpropyl groups, and oxyethylene groups, respectively. Furthermore, in the examples, measurements and evaluations were performed as described below.

<Viscosity of Photocurable Liquid Silicone Composition and Various Components>

Each viscosity (mPa·s) at 23° C. of the photocurable liquid silicone composition and various components was measured using an E type viscometer VISCONIC EMD manufactured by TOKIMEC CORPORATION.

<Weight Average Molecular Weight of Organopolysiloxane>

The weight average molecular weight of the organopolysiloxane calculated as standard polystyrene was determined by gel permeation chromatography using a light scattering detector.

<Chemical Structure of Organopolysiloxane>

The chemical structure of the organopolysiloxane was identified using nuclear magnetic resonance spectral analysis.

<Appearance of Photocurable Liquid Silicone Composition>

The appearance of the photocurable liquid silicone composition was visually observed and evaluated as described below.

A: Transparent

B: Slightly cloudy

<Curing Properties of Photocurable Liquid Silicone Composition>

The photocurable liquid silicone composition is filled between two polycarbonate sheets with a thickness of 2 mm such that the thickness after curing is approximately 200 μm (fill area: 20×20 mm$^2$), and then LED light with a wavelength of 405 nm was irradiated at an intensity of 50 mW/cm$^2$ for 40 seconds. The two polycarbonate sheets were peeled off, the composition was observed to determine if fluidity was lost and the composition was cured, and then evaluation was performed as described below.

A: Cured

B: Not cured

<Transparency of Cured Product>

The photocurable liquid silicone composition is filled in a die with regular shaped depressions such that the thickness after curing is approximately 500 μm (fill area: 40×40 mm$^2$), and then LED light with a wavelength of 405 nm was irradiated at an intensity of 50 mW/cm$^2$ for 40 seconds. The transparency of the cured product obtained at a wavelength of 450 nm was measured according to the method set forth in ASTM D1003.

<Cloudiness of Cured Product>

The photocurable liquid silicone composition is filled between two glass sheets with a thickness of 2 mm such that the thickness after curing is approximately 200 μm (fill area: 20×40 mm$^2$), and then LED light with a wavelength of 405 nm was irradiated at an intensity of 50 mW/cm$^2$ for 40 seconds. The cured product produced between the two glass sheets was held for 1000 hours in an environment at 85° C. and 85% RH, after which cloudiness was measured according to the method set forth in ASTM D1003.

<Yellowness of Cured Product>

The yellowness b* of the cured product produced between the two glass sheets that was fabricated for the cloudiness test was measured by the method according to ASTM D6290. Next, the plate shaped cured product was held for 1000 hours in an environment at 85° C. and 85% RH, and then the yellowness b* was measured as described above.

<Adhesion of Cured Product>

The photocurable liquid silicone composition was filled between a glass sheet and a polycarbonate sheet with a thickness of 2 mm such that the thickness after curing was approximately 200 μm (fill area: 20×20 mm$^2$), after which LED light with a wavelength of 405 nm was irradiated at an intensity of 50 mW/cm$^2$ for 40 seconds. The adhesive strength of the cured product formed between the two glass sheets was measured by the method according to ASTM D3163 (tensile speed: 100 mm/minute).

Examples 1 to 8 and Comparative Examples 1 to 3

A solvent free photocurable liquid silicone composition was prepared from the following components using the composition (parts by mass) shown in Table 1. Note that the photocurable liquid silicone composition was prepared and provide 1 mol of 3-mercaptopropyl group in component (B) with regard to 1 mol of vinyl groups in component (A).

The following components were used as component (A). (a-1): a dimethylpolysiloxane endblocked at both molecular chain terminals with dimethylvinylsiloxy groups and having a viscosity at 23° C. of 500 mPa·s (a-2): a copolymer of dimethylsiloxane and diphenylsiloxane endblocked at both molecular chain terminals with dimethylvinylsiloxy group, having a viscosity at 23° C. of 300 mPa·s, and represented by the formula:

$$Me_2ViSiO(Me_2SiO)_{95}(Ph_2SiO)_5SiMe_2Vi$$

The following component was used as component (B). (b-1): a copolymer of dimethylsiloxane and methyl(3-mercaptopropyl)siloxane endblocked at both molecular chain terminals with trimethylsiloxy groups, having a viscosity at 23° C. of 100 mPa·s, and represented by the formula:

$$Me_3SiO(Me_2SiO)_{26}(MeThiSiO)_3SiMe_3$$

The following component was used as component (C). (c-1): an organopolysiloxane having a weight average molecular weight of 3,200 and represented by the average unit formula:

$$(Me_3SiO_{1/2})_{0.41}(SiO_{4/2})_{0.59}$$

The following component was used as component (D). (d-1): diphenyl(2,4,6-trimethylbenzoyl)phosphine oxide The following component was used as component (E). (e-1): 2,6-di-tert-butyl-4-methylphenol The following component was used as component (F). (f-1): an organopolysiloxane having an ether group and represented by the average formula:

$$Me(EO)_3(OCH_2CH(Me)CH_2)Me_2SiO(Me_2SiO)_{10}$$
$$(MeViSiO)_{2.5}SiMe_2(CH_2CH(Me)CH_2)$$
$$(EO)_3OMe$$

The following component was used as component (G). (g-1): 1-hexadecene

The following components were used as the other arbitrary components. (x-1): 2-hydroxy-2-methyl-1-phenyl-propan-1-one (x-2): 1,1,3,3-tetramethyl-1,3-divinyl disiloxane (x-3): 1,3,5,7-tetramethyl-1,3,5,7-tetravinyl cyclotetrasiloxane When preparing the photocurable liquid silicone composition, component (c-1) was prepared by a mixture produced by diluting a 75 mass % xylene solution thereof with component (a-1) or component (a-2), then completely removing the xylene under reduced pressure. Furthermore, component (d-1) was prepared by first diluting in component (x-1). Furthermore, component (e-1) was prepared by first diluting in component (x-2) or component (x-3).

TABLE 1

|  |  | Example | | | | | | | | Comparative Example | | |
|---|---|---|---|---|---|---|---|---|---|---|---|---|
|  |  | 1 | 2 | 3 | 4 | 5 | 6 | 7 | 8 | 1 | 2 | 3 |
| Composition of | (a-1) | 32.60 | 35.00 | 40.98 | 55.15 | 31.78 | 29.22 | — | 15.02 | 35.00 | 66.80 | — |
| photocurable | (a-2) | — | — | — | — | — | — | 28.60 | — | — | — | 79.60 |
| liquid | (b-1) | 7.92 | 8.16 | 8.99 | 10.95 | 9.71 | 16.56 | 18.31 | 36.33 | 8.16 | 12.50 | 19.70 |
| silicone | (c-1) | 58.78 | 56.14 | 49.33 | 33.20 | 57.31 | 52.60 | 51.48 | 27.04 | 56.14 | 20.00 | — |
| composition | (d-1) | 0.05 | 0.05 | 0.05 | 0.05 | 0.05 | 0.05 | 0.05 | 0.05 | — | 0.05 | 0.05 |
| (parts by mass) | (e-1) | 0.13 | 0.13 | 0.13 | 0.13 | 0.13 | 0.13 | 0.13 | 0.13 | 0.13 | 0.13 | 0.13 |
|  | (f-1) | — | — | — | — | — | — | — | 20.00 | — | — | — |
|  | (g-1) | — | — | — | — | 0.50 | — | — | — | — | — | — |
|  | (x-1) | 0.13 | 0.13 | 0.13 | 0.13 | 0.13 | 0.13 | 0.13 | 0.13 | 0.18 | 0.13 | 0.13 |
|  | (x-2) | 0.39 | 0.39 | 0.39 | 0.39 | 0.39 | — | — | — | 0.39 | 0.39 | 0.39 |
|  | (x-3) | — | — | — | — | — | 1.30 | 1.30 | 1.30 | — | — | — |
| Viscosity (mPa · s) | | 19700 | 8700 | 2600 | 740 | 9000 | 3500 | 3070 | 150 | 8600 | 480 | 230 |
| Appearance | | A | A | A | A | A | A | A | A | A | B | A |
| Curing properties | | A | A | A | A | A | A | A | A | B | A | A |
| Transparency (%) | | 98 | 97 | 97 | 97 | 97 | 97 | 98 | 97 | — | 95 | 98 |
| Cloudiness | | <0.5 | <0.5 | <0.5 | <0.5 | <0.5 | <0.5 | <0.5 | <0.2 | — | <0.5 | 3.8 |
| b* value | Initial | <0.2 | <0.2 | <0.2 | <0.2 | <0.2 | <0.2 | <0.2 | <0.2 | — | <0.2 | <0.2 |
|  | after 1000 hours | <0.2 | <0.2 | <0.2 | <0.2 | <0.2 | <0.2 | <0.2 | <0.2 | — | <0.2 | <0.2 |

The results of Examples 1 to 8 confirmed that the photocurable liquid silicone composition of the present invention has favorable transparency, and even after curing, has high transparency and excellent high temperature and high humidity resistance. On the other hand, the results of Comparative Example 1 confirmed that a photocurable liquid silicone composition not containing component (D) will not cure by long wavelength light, with the results of Comparative Example 2 confirming that the transparency of the cured product is reduced if the amount of component (C) is insufficient. Furthermore, the results of Example 8 confirmed that the photocurable liquid silicone composition containing component (F) of the present invention has favorable transparency, and even after curing, has high transparency and excellent high temperature and high humidity resistance.

INDUSTRIAL APPLICABILITY

The photocurable liquid silicone composition of the present invention quickly cures by irradiation with long wavelength light, for example, visible light having a wavelength of 405 nm, maintains transparency even when left under high temperature and high humidity conditions, and forms a cured film with minimal clouding and discoloration, and therefore is useful as a protective film or pressure sensitive adhesive for optical displays, and in particular, can also be applied to displays in which the cover material is a plastic material such as polycarbonate.

The invention claimed is:

1. A photocurable liquid silicone composition comprising:
(A) a straight chain organopolysiloxane with a viscosity at 23° C. of 50 to 100,000 mPa·s, containing at least two alkenyl groups with 2 to 12 carbon atoms in a molecule, and not containing a mercaptoalkyl group;
(B) an organopolysiloxane with a viscosity at 23° C. of 10 to 10,000 mPa·s and having at least two mercaptoalkyl groups in a molecule, in an amount such that the amount of mercaptoalkyl groups in this component is 0.2 to 3 moles with regard to 1 mole of alkenyl groups in component (A);
(C) a branched chain organopolysiloxane containing siloxane units represented by the formula: $R^3SiO_{3/2}$ and/or siloxane units represented by the formula: $SiO_{4/2}$ where $R^3$ represents an alkyl group with 1 to 12 carbon atoms, an aryl group with 6 to 20 carbon atoms, an aralkyl group with 7 to 20 carbon atoms, a hydroxyl group, or an alkoxy group with 1 to 6 carbon atoms, wherein the molar ratio of siloxane units represented by the formula: $R^3SiO_{3/2}$ and the siloxane units represented by the formula: $SiO_{4/2}$ of all of the siloxane units in component (C) is at least 0.5 and no greater than 0.65, and alkenyl groups and mercaptoalkyl groups are not included;
(D) a photo radical initiator containing a phosphorus atom; and
(E) a hindered phenol compound;
wherein the amount of component (C) is 25 to 80 parts by mass, the amount of component (D) is 0.01 to 1.0 parts by mass, and the amount of component (E) is 0.01 to 1.0 parts by mass, with regard to 100 parts by mass of a total of component (A) through component (E).

2. The photocurable liquid silicone composition according to claim 1, further comprising:
(F) 1 to 50 parts by mass of an organopolysiloxane having an organic group with an ether bond and an alkenyl group with 2 to 12 carbon atoms in a molecule, however excluding organopolysiloxane corresponding to component (A), and not having a mercaptoalkyl group, with regard to 100 parts by mass of a total of component (A) through component (E).

3. The photocurable liquid silicone composition according to claim 1, further comprising:
(G) 0.1 to 10 parts by mass of an organic compound having one aliphatic unsaturated bond in a molecule, and not having a siloxane bond, with regard to 100 parts by mass of a total of component (A) through component (E).

4. The photocurable liquid silicone composition according to claim 1, wherein the viscosity at 23° C. is 100,000 mPa·s or less.

5. The photocurable liquid silicone composition according to claim 1, which is a pressure sensitive adhesive composition for optical applications.

6. A cured product made by irradiating and curing the photocurable liquid silicone composition according to claim 1.

7. The photocurable liquid silicone composition according to claim 2, further comprising:
(G) 0.1 to 10 parts by mass of an organic compound having one aliphatic unsaturated bond in a molecule, and not having a siloxane bond, with regard to 100 parts by mass of a total of component (A) through component (E).

* * * * *